O. F. SMITH.
SEED DISCHARGING MECHANISM.
APPLICATION FILED DEC. 21, 1915.

1,244,787.

Patented Oct. 30, 1917.
3 SHEETS—SHEET 1.

Attest:

Inventor:
O. F. Smith
by Rogers, Kennedy & Campbell
Attys

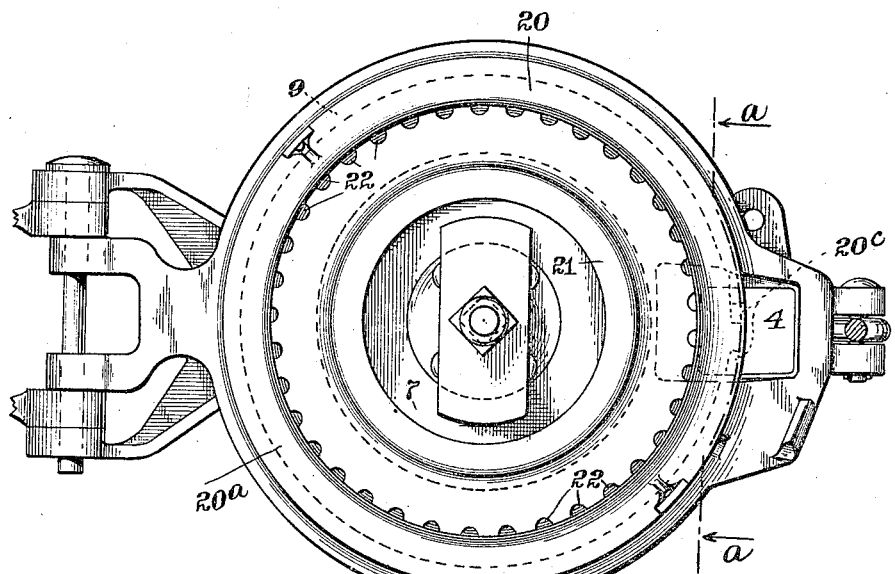
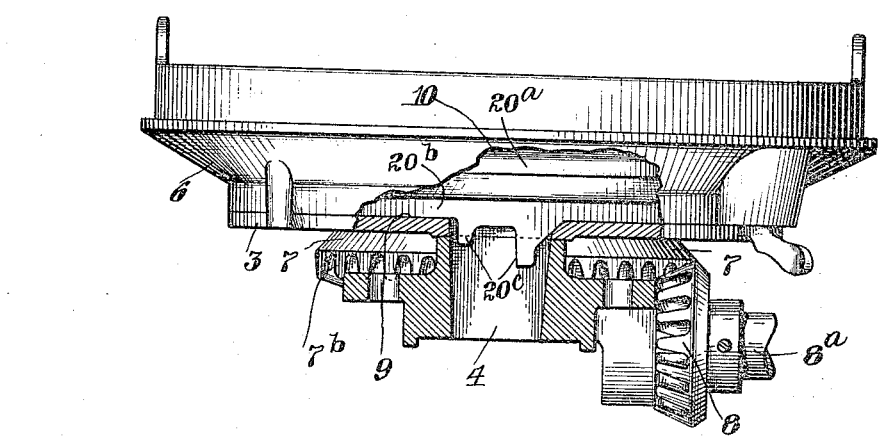

UNITED STATES PATENT OFFICE.

ORBIN F. SMITH, OF MOLINE, ILLINOIS, ASSIGNOR TO MOLINE PLOW COMPANY, A CORPORATION OF ILLINOIS.

SEED-DISCHARGING MECHANISM.

1,244,787.

Specification of Letters Patent.

Patented Oct. 30, 1917.

Application filed December 21, 1915. Serial No. 67,959.

*To all whom it may concern:*

Be it known that I, ORBIN F. SMITH, a citizen of the United States, residing at Moline, in the county of Rock Island and State of Illinois, have invented certain new and useful Improvements in Seed-Discharging Mechanism, of which the following is a specification, reference being had therein to the accompanying drawing.

This invention relates to seed discharging mechanism of the type in which the seed, contained in a can or hopper, is discharged from the bottom thereof by means of a rotary seed plate containing seed cells, in which cells the seed enter from the overlying mass and by which they are carried in the rotation of the plate to the point of discharge. In a certain type of mechanism of this character the seed cells are in the form of open notches in the edge of the plate and are known in the art as "edge cells", because of the fact that the seed are carried in the cells on edge, and the plate is so rotatably supported on a suitable base plate that the cells will travel in close proximity to a surrounding relatively fixed surface which closes the outer sides of the cells, whose bottoms are closed by the base plate. The base plate is provided at one point with a discharge opening to permit the seed to leave the cells and be discharged, a cut-off device being employed which acts adjacent the point where the seeds are discharged and prevents entrance of more than one seed in a cell, and a knocker device being also employed, which acts on the seed in the cells as they reach the discharge opening and insures the discharge of the same from the cells. The seed plates are usually employed in series or sets, being distinguished from each other in the dimensions of the cells, so that different kinds of seeds may be planted, and the plates of the series are interchangeable in the mechanism to adapt one or another form of plate to be used according to the kind of seed to be planted. As seed vary much in size and shape, from the largest seed such as Lima beans, to the smallest such as onion seed, it is impracticable to provide a set of plates of the same diameter for all the different kinds of seed, for the reason that the cut-off device and knocker device could not be made to operate properly in connection with the widely varying forms and sizes of the cells in the different plates. For instance if the cut-off device is set normally high enough for the larger seed it will be entirely too high to operate properly in connection with a plate containing relatively small cells for smaller seeds.

It is the aim of my invention to overcome this difficulty and to provide for the use in the same mechanism of a series of interchangeable seed plates with cells varying widely in dimensions, to handle seed varying in size from the maximum to the minimum, and the invention consists in so forming the base plate on which the seed plates are rotatably supported, that plates of different diameters may be employed, a larger diameter with large cells for the large seed, and plates of smaller diameter with smaller cells for the smaller seeds, a suitable filler ring being employed when the smaller plates are to be used, which filler ring will overlie the outer portion of the supporting plate. As a result of this arrangement and construction of the parts, a great variety of seed plates for handling different kinds of seed varying greatly in size, from the maximum, such as Lima beans, to the minimum, such as onion seeds, may be employed in the one mechanism in connection with a supporting base plate common to all of the seed plates.

The invention also consists of cut-off devices and a knocker device of improved form and construction, and arranged to coöperate with the seed cells of different sized plates.

In the accompanying drawings:

Fig. 5 is a plan view showing the relation of the seed plate shown in the preceding figure to the discharge opening.

Fig. 6 is a sectional elevation taken on the line *a—a* of Fig. 5 showing the means for preventing circumferential movement of the filler ring.

Figure 1:
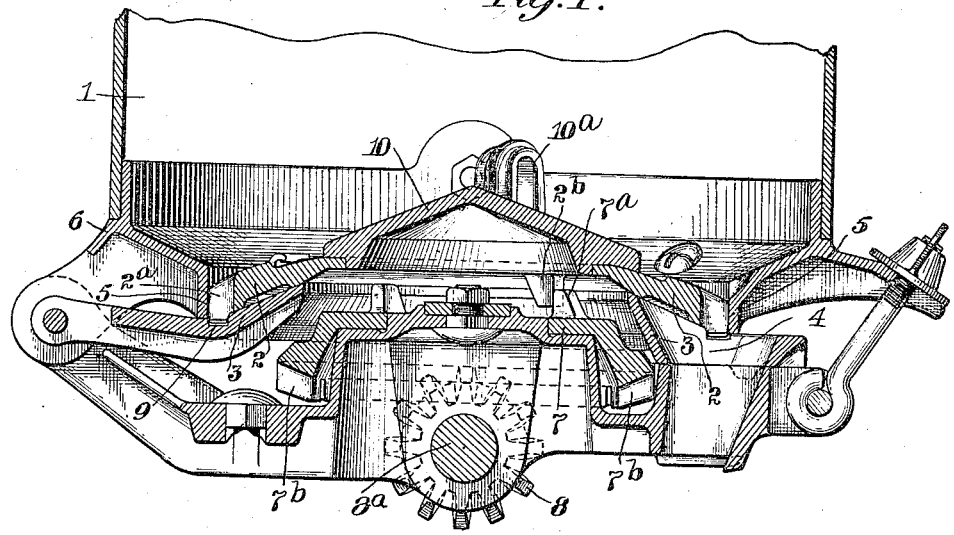
Figure 1 is a vertical sectional elevation through a seed discharging mechanism showing the same equipped with a relatively large seed plate for planting large seed.
Figure 2:
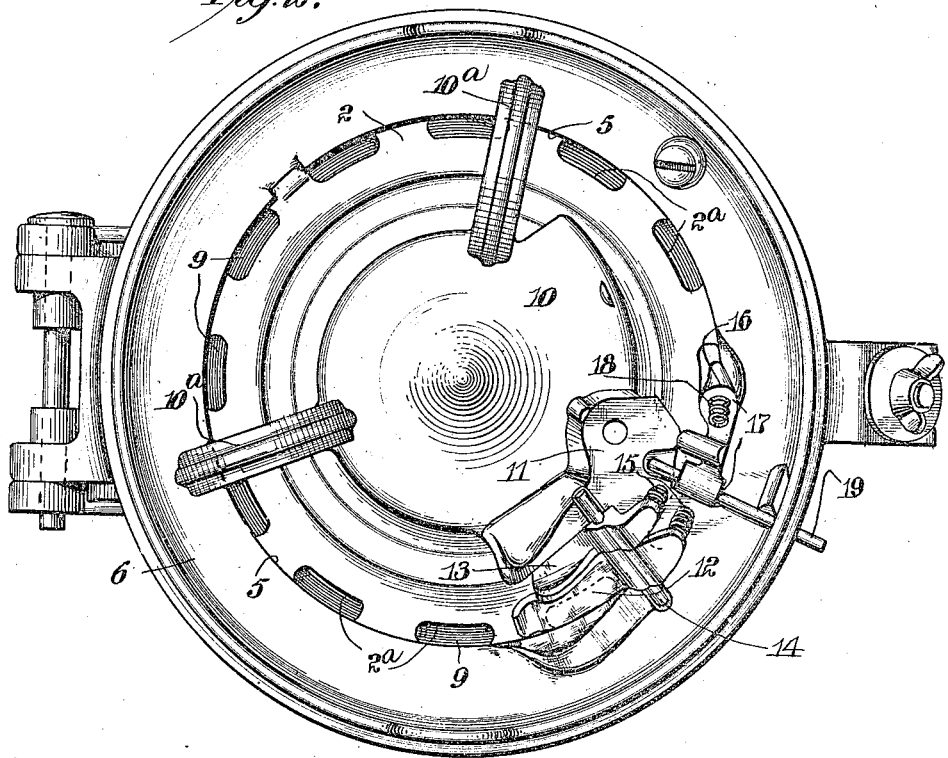
Fig. 2 is a top plan view of the same, the covering plate for the cut-off and knocker devices being removed to expose these parts to view.

Referring to the drawings:

1 represents a cam or hopper to contain the seed to be planted in the bottom of which is a seed discharging mechanism comprising a rotary seed plate 2, which is supported for rotation on a supporting or base plate 3, in the form of a ring containing at one point an opening 4 therethrough, through which the seed carried by the plate are discharged. The seed plate is of ring-like form, and contains in its outer edge open notches $2^a$ constituting edge cells in which the seed enter from the overlying mass in the hopper and by which they are carried over the discharge opening. The outer edge of the plate travels in close proximity to a fixed surrounding surface 5 forming an annular shoulder and constituting the inner edge of a ring or frame 6 which forms in effect the base of the cam or hopper 1. The seed plate is adapted to be rotated by any appropriate and suitable means. In the present instance a horizontal rotary head 7 is employed, which is mounted for rotation centrally beneath the base plate 3, being provided with up-standing driving lugs $7^a$ which, when a seed plate is supported by the base plate, will engage depending driving lugs $2^b$ on the under side of the seed plate, the said driving head being provided with gear teeth $7^b$ adapted to be engaged by a driving pinion 8 carried by a shaft $8^a$ mounted in the frame structure and adapted to be driven from a suitable source of power.

The supporting surface of the base plate 3 slopes outwardly and downwardly from its inner edge and terminates in an open annular channel 9 at the outer edge of the plate, and when one of the larger seed plates 2 is in operative position on the base plate, the seed cells $2^a$ therein will register with the said annular channel, the bottom of which will form the bottoms of the seed cells, and the outer sides of which cells will be closed by the surrounding surface 5 on the base ring 6. The channel 9 in the base plate thus forms in effect a downward continuation of the seed cells, thereby forming cells of extreme depth suitable for accommodating the larger size seeds such as Lima beans and the like.

Overlying the central open portion of the base plate and the driving head 7, is a cap plate 10 sustained by arms $10^a$ extending inwardly from the base ring 6, which cap plate acts to direct the overlying seed outwardly so that they will enter the seed cells. At one side, where the discharge opening in the base plate is located, the annular space between the cap plate and base ring is bridged by a bracket plate 11 in the under side of which are mounted side by side, an outer cut-off device 12 and an inner cut-off device 13. These cut-off devices are in the form of fingers mounted side by side and pivotally sustained at one end by means of a radially extending pivot pin 14 carried by the bracket plate and extending loosely through openings in the ends of the fingers, springs 15 being provided which bear against the upper sides of the fingers and which urge the free ends of the fingers yieldingly downwardly. These cut-off devices are adapted to coöperate respectively with the different sized seed plates, the outer cut-off device 12 bearing on the upper surface of the larger plate in line with the seed cells therein when a larger plate is used, and acting to dislodge the surplus seed from the cells; and the inner cut-off device 13 similarly coöperating with a small plate when the latter is used. These devices are rendered active and inactive according to the size of plate in use, in the manner to be more fully described hereinafter.

Mounted on the under side of the bracket plate over the discharge opening is a knocker device 16 consisting of a finger pivoted at one end on a horizontal axis 17, and adapted at its opposite end to enter the cells in the seed plate as the cells pass over the discharge opening, and acting to dislodge the seeds therefrom and insure their delivery into the discharge opening. This finger is acted on as usual by a spring 18 bearing on the upper side of the same. The axis of this knocker device is in the form of a rod 19, which is pivoted at its inner end on a vertical axis so that the rod may be swung thereon in order to adjust the knocker device from an outer position where it will coöperate with the seed cells in the larger plates 2, to an inner position where it will coöperate with seed cells in plates of smaller diameter as will be more fully described hereinafter.

The mechanism so far described employing a seed plate 2 of larger diameter is adapted for handling seed of the larger size, such as Lima beans and the like, the seed plate in the operation of the mechanism acting to carry the seed contained in the cells successively and continuously to the discharge opening 4, at which point the seed will leave the cells and be delivered through the discharge opening, the outer cut-off device 12 being operative to perform its functions in connection with the larger seed plate, and the knocker device being adjusted to its outer position so that it will perform its functions in connection with said plate.

Figure 3:
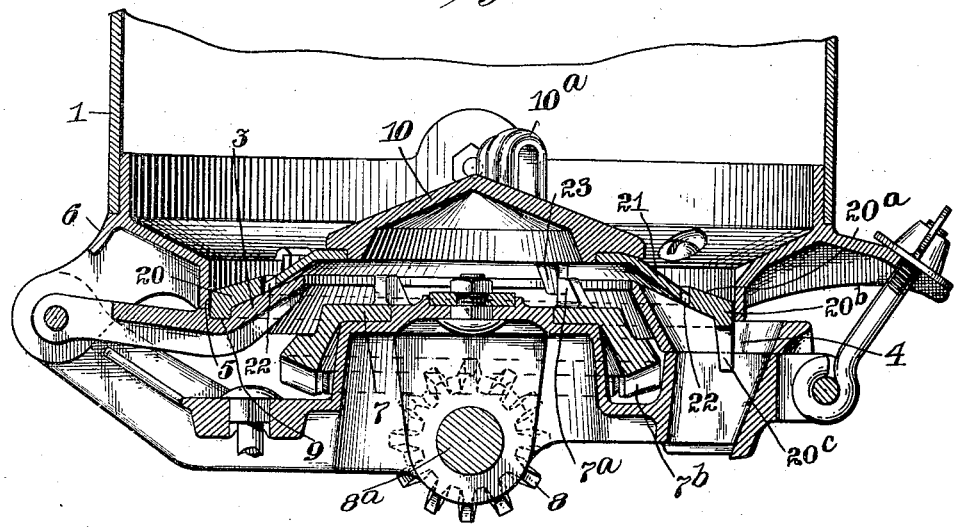
Fig. 3 is a section similar to Fig. 1 showing the mechanism with the filler ring and one of the small seed plates applied.
Figure 4:
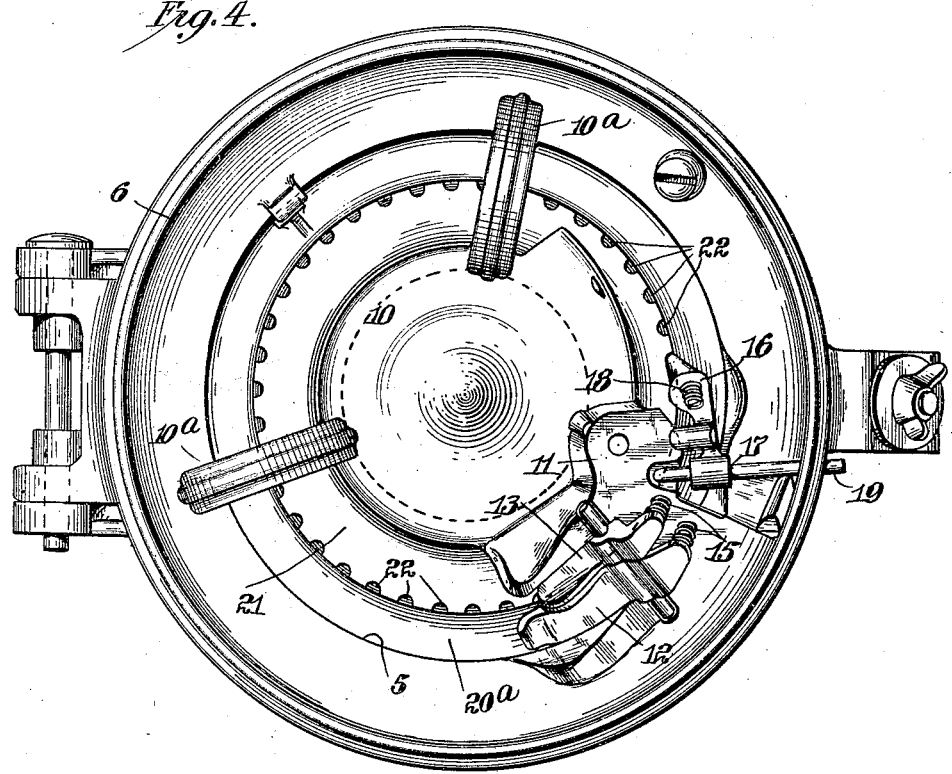
Fig. 4 is a plan view of the same with the covering plate for the cut-off and knocker devices removed to expose these parts to view.

In order that seed plates of smaller diameter containing cells of smaller dimensions may be employed to handle the smaller seeds such as Egyptian corn, Kafir corn, onion seeds, milomaize, feterita, and the like, and in order that these plates may be employed in the same mechanism with the larger plates, and may be operated coöperatively with the cut-off and knocker mechanisms, I provide a filler ring 20 which, when the larger plate 2 is removed, may be applied to the base plate as shown in Figs. 3 and 4, and which when so applied will enter the open channel in the edge of the base plate, and will cover the outer portion of the same, thereby leaving the central inner portion of the base plate exposed to receive one of the smaller seed plates 21, which latter are of a size to fit loosely but closely within the filler ring in such position that the inner edge of the ring will close the outer sides of the edge cells 22 in the plates. The filler ring consists of an upper downwardly sloping body portion 20$^a$, and an annular depending flange 20$^b$, the flange extending within and filling the open annular channel in the base plate, and the sloping portion 20$^a$ overlying and covering the outer portion of the base plate. The filler ring at one point is formed with depending lugs 20$^c$ which are adapted, when the filler ring is in position, to extend down into the discharge opening in the base plate between the side walls of the opening, and which will thereby prevent the filler ring from moving circumferentially and maintain it in position on the base plate. The discharge opening in the base plate extends radially inward beyond the inner edge of the filler ring so that the cells of the smaller seed plate will register with the inner portion of the discharge opening as the plate is rotated, and the seeds will be delivered therethrough. The smaller seed plates are formed on their under sides with depending lugs 23 similar to the lugs of the larger seed plate, by which the plate 21 will be rotated from the driving head 7 in the same manner as the larger plates are rotated by said head. The relation of the parts is such that when the filler ring is in place it will engage the under side of the outer cut-off device and will render the same inoperative, but will not interfere with the action of the inner cut-off device, which latter will bear on the small seed plate over the cells therein and will act to perform its cut-off functions in connection with said seed plate. The knocker device, when the filler ring is employed and with the smaller seed plate in use, will be adjusted inwardly to its inner position as shown in Fig. 4 so that it will coöperate with the cells of the smaller plate and perform its functions in connection therewith.

In the operation of the mechanism, when it is desired to plant seeds of the larger size, such as Lima beans and the like, an appropriate seed plate of the larger diameter is applied to the base plate, and in the rotation of the same, the seed will enter the edge cells and will be carried continuously and successively to the discharge opening and will be acted on by the outer cut-off device and the knocker device, with the latter adjusted in its outer position. When now the mechanism is to be employed for planting the smaller size seeds, the larger plate is removed, the filler ring is applied to the base plate with the lugs thereon extending in the discharge opening, and one of the smaller seed plates is set in place over the central portion of the base plate. The inner edge of the filler ring will close the outer sides of the seed cells and bearing against the outer cut-off device will render the same inoperative, the knocker device being adjusted to its inner position. When the plate is rotated, the seed in the cells will be advanced to the discharge opening subject to the action of the inner cut-off device and to the action of the knocker device, and the seed will be delivered to the discharge opening at the inner side of the same.

It will thus be seen that by the construction and arrangement described I am enabled by the use of the filler ring to employ a great number of seed plates containing cells of varying sizes to accommodate various kinds of seed, ranging in size from the maximum, such as Lima beans, to the minimum, such as onion seed, all of the plates being adapted to be operatively supported by the one base plate, being adapted to be driven by the single driving head, and being adapted to coöperate with the cut-off and knocker mechanisms.

Having thus described my invention, what I claim is:

1. In a seed discharging mechanism, the combination of a base plate provided with a seed discharging opening, said base plate being formed to give support at will to seed plates of respectively different diameters having edge cells therein, a removable filler ring overlying the outer portion of the base plate, a removable rotary seed plate supported by the base plate within the filler ring and having edge cells therein closed at their outer sides by the edge of the filler ring, an annular shoulder in position to close the outer sides of the cells in a plate of larger diameter when the latter is substituted for the filler ring and its associated seed plate, and means for rotating the seed plate to carry the cells in discharging relation to the discharge opening.

2. In a seed discharging mechanism, the combination of a base plate provided with a seed discharging opening and having an open peripheral channel, a removable filler ring overlying the outer portion of the base plate and extending in said channel, a rotary seed plate supported by the base plate within the filler ring and having edge cells closed at their outer sides by the filler ring, and means for rotating said seed plate.

3. In a seed discharging mechanism, the combination of a base plate provided with an open peripheral channel and having a seed discharge opening intersecting the channel, said base plate being adapted to give support to a removable rotary seed plate having edge cells which will register with the channel, and which will pass over the outer portion of the discharge opening, a removable filler ring overlying the outer portion of the base plate and extending in said channel, a rotary seed plate supported by the base plate within the filler ring and provided with edge cells closed at their outer sides by the surrounding filler ring, and closed at their bottoms by the base plate, said cells adapted in the rotation of the plate to pass over the inner portion of the discharge opening, and means for rotating the plate.

4. In a seed discharging mechanism, the combination of a base plate having a seed discharging opening and adapted to give support to a removable rotary seed plate having cells which will register with the outer portion of the discharge opening, a cut-off device in position to coöperate with the cells in said removable seed plate, a removable filler ring overlying the outer portion of the base plate in position to render said cut-off device inoperative, a rotary seed plate supported by the base plate within the filler ring and having seed cells adapted to register with the discharge opening, and means for rotating said seed plate.

5. In a seed discharging mechanism, the combination of a base plate having a seed discharging opening and adapted to give support to a rotary seed plate of large diameter having seed cells which will register with said discharging opening, a removable filler ring overlying the outer portion of the base plate and adapted to coöperate with a series of interchangeable rotary seed plates of smaller diameter having edge cells of different dimensions to accommodate different kinds of seeds, each of said seed plates of smaller diameter adapted to be supported by the base plate within the filler ring, with the outer sides of the cells closed by the inner edge of the ring, and means for rotating the supported seed plate.

6. In a seed discharging mechanism, the combination of a base plate provided with an open peripheral channel and having a seed discharging opening intersecting the channel, said base plate adapted to give support to a removable rotary seed plate having edge cells which will register with the channel and which will pass over the outer portion of the discharge opening, an outer cut-off device supported in position to coöperate with the cells in said removable seed plate, a removable filler ring overlying the outer portion of the base plate and provided with a peripheral flange seated in the channel in the base plate, said filler ring being in position to render the cut-off device inoperative, a rotary seed plate supported by the base plate within the filler ring and provided with edge cells closed at their outer sides by the ring and adapted in the rotation of the ring to register with the inner portion of the discharge opening, an inner cut-off device coöperating with said seed plate, and means for rotating said seed plate.

7. In a seed discharging mechanism, the combination of a base plate to support interchangeable seed plates of different diameters having edge cells, a filler ring removably supported by the outer portion of the base plate and having an annular inner surface, and a removable seed plate of relatively small diameter supported by the base plate in position to have the outer sides of its edge cells closed by said annular surface on the filler ring, said filler ring being removed when a large seed plate is supported by the base plate.

8. A seed discharging mechanism having means for operating interchangeable seed plates of different diameters containing different sized edge cells for seeds of different sizes, in combination with a member adapted to coöperate with plates of smaller diameter in closing the outer sides of the seed cells, said member being removable to permit the use of a plate of larger diameter, and a seed plate of smaller diameter in position to have its cells closed by said member.

9. In a seed discharging mechanism, the combination of a series of interchangeable seed plates of different diameters containing seed cells of different dimensions for different kinds of seeds, and a filler member adapted for use in connection with the plates of the smaller diameter, and movable to permit the use of plates of larger diameter.

In testimony whereof I have affixed my signature.

ORBIN F. SMITH.